No. 663,000. Patented Dec. 4, 1900.
M. A. ACKLES.
VALVE REPAIRING MACHINE.
(Application filed Feb. 17, 1900.)
(No Model.) 2 Sheets—Sheet 1.
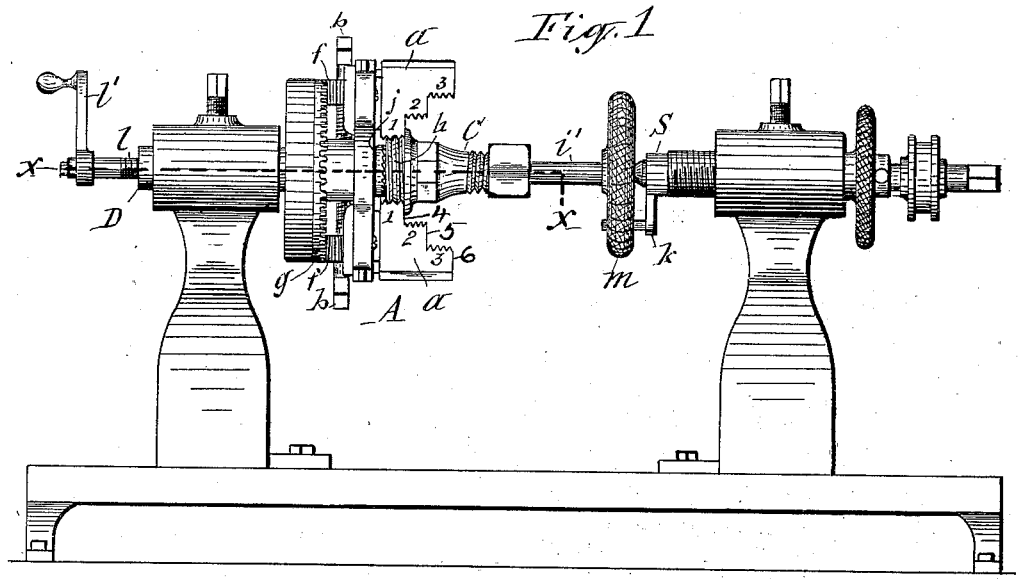
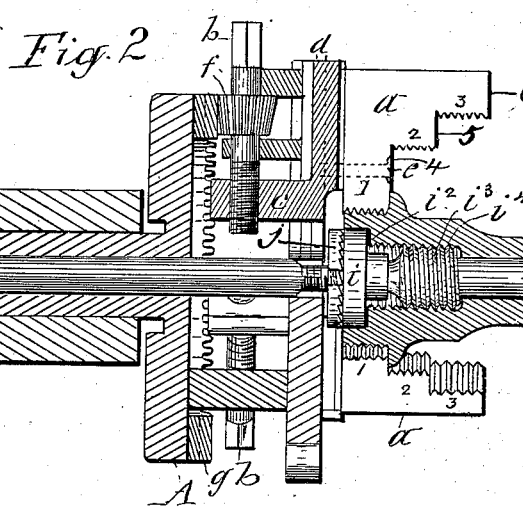
WITNESSES:
H. B. Smith
J. J. Laass
INVENTOR
Mortimer A. Ackles
By E. Laass
ATTORNEY No. 663,000. Patented Dec. 4, 1900.
M. A. ACKLES.
VALVE REPAIRING MACHINE.
(Application filed Feb. 17, 1900.)
(No Model.) 2 Sheets—Sheet 2.

WITNESSES
H. B. Smith
J. J. Laass

INVENTOR
Mortimer A. Ackles
By E. Laass
ATTORNEY

UNITED STATES PATENT OFFICE.

MORTIMER A. ACKLES, OF SKANEATELES, NEW YORK.

VALVE-REPAIRING MACHINE.

SPECIFICATION forming part of Letters Patent No. 663,000, dated December 4, 1900.

Application filed February 17, 1900. Serial No. 5,599. (No model.)

*To all whom it may concern:*

Be it known that I, MORTIMER A. ACKLES, a citizen of the United States, and a resident of Skaneateles, in the county of Onondaga, in the State of New York, have invented new and useful Improvements in Valve-Repairing Machines, of which the following, taken in connection with the accompanying drawings, is a full, clear, and exact description.

This invention relates to a machine which is designed for refacing or repairing valve-disks of different forms and sizes, and which machine is capable of gripping the work either externally or internally, as may be required by the character or form of the articles to be operated on; and one of the objects of the invention is to provide a chuck of minimum diameter for performing the aforesaid operation; and to that end the invention consists in the novel construction and combination of its component parts, as hereinafter described and claimed.

Figure 3:
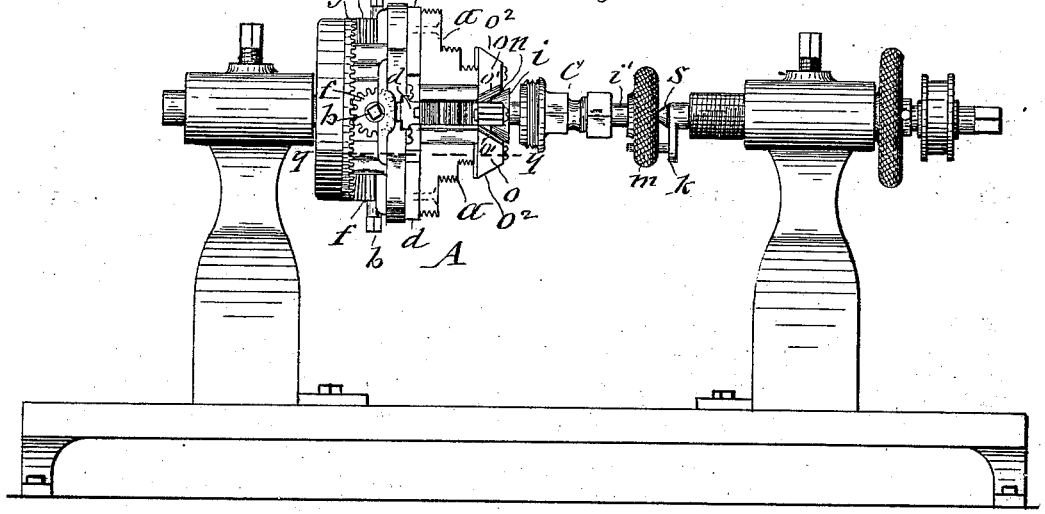
Figure 4:
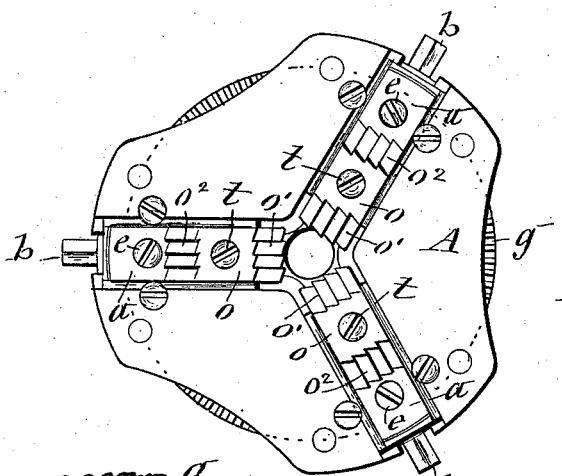
Figure 5:
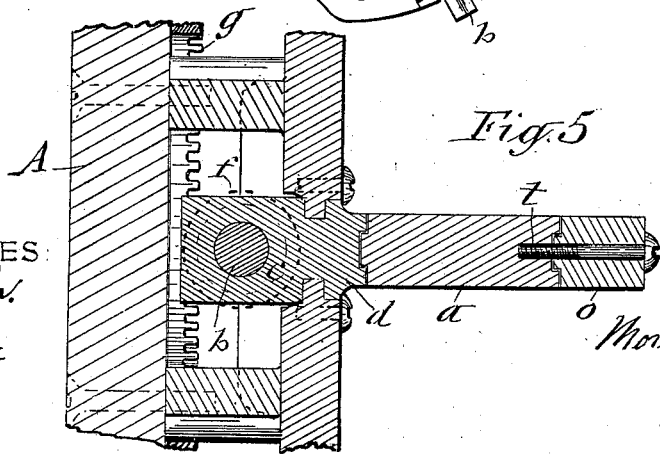

In the annexed drawings, Figure 1 is a side elevation of my invention adjusted for repairing a flat-faced valve-disk. Fig. 2 is an enlarged horizontal longitudinal section on line X X in Fig. 1. Fig. 3 is a side elevation of my invention adjusted for repairing the beveled edges of a valve-disk. Fig. 4 is an enlarged face view of the chuck, and Fig. 5 is an enlarged longitudinal section on line Y Y in Fig. 3.

Similar characters of reference indicate corresponding parts.

A represents a chuck which is provided with radially-adjustable jaws $a\ a\ a$, formed with stepped gripping-faces 1 2 3 for holding either the valve-disk to be refaced or the cutters for operating on said disk, according to the shape and size of the said disk. This chuck pertains to the class usually termed "universal" chucks, in which all the jaws are adjusted simultaneously toward and from the axis of the chuck by means of screws $b\ b$, working in nuts $c\ c$, affixed to the bases $d\ d$, which are seated in radial grooves in the face of the chuck-body and have the jaws fastened to them by screws $e$, which allow said jaws to be detached and reversed on their respective seats or bases $d$. To the screws $b\ b$ are firmly attached pinions $f\ f$, engaging an annular rack $g$, seated revolubly in the chuck-body, which rack and pinions serve to impart synchronous movement to all the screws which adjust the jaws. Each of the jaws has only one set of gripping-faces 1 2 3, presented in one direction and formed with screw-threads to engage correspondingly-screw-threaded parts of the article to be gripped. The opposite face of the jaw is smooth and formed in a continuous plane parallel to the axis of the chuck and concaved transversely, so that the combined jaws form on the front of the chuck a throat, as shown in Fig. 3 of the drawings, which throat is designed for the reception of the usual guide-wings of a puppet-valve or check-valve to be refaced. It is this particular construction of the jaws which requires them to be reversible on the chuck.

For refacing a flat-faced valve-disk, as represented in Figs. 1 and 2 of the drawings, the jaws $a\ a\ a$ are to be set in positions to grip the exterior of the usual externally-screw-threaded attaching end of the stuffing-box C, through which the valve-stem $i'$ of the valve $i$ passes. In order to more positively sustain said stuffing-box axially parallel with the chuck, the jaws $a\ a\ a$ are formed with flat faces 4 5 6 adjacent to the gripping-faces 1 2 3, which flat faces are in planes at right angles to the axis of the chuck and serve as seats for the flange on the stuffing-box, as clearly shown in Figs. 1 and 2 of the drawings.

For refacing the flat-faced valve-disk $i$ a circular cutting-disk $j$ is employed. This cutting-disk is provided with radial cutting edges on its face and is fastened to the inner end of the spindle $l$, which passes through the tubular stem D of the chuck. Said cutter, with its spindle, is obviously applied to the chuck before the stuffing-box C, supporting the valve $i$, is gripped between the jaws $a\ a\ a$.

In placing the stuffing-box C in the lathe the live-spindle S engages the center of the outer end of the valve-stem and the dog $k$, attached to said spindle, engages the hand-wheel $m$ on the valve-stem and transmits rotary motion to said valve-stem and valve attached thereto.

By means of a crank $l'$ on the spindle $l$ the latter, with the cutter $j$, is prevented from turning during the rotation of the valve. However, if it is desired the valve can be operated on without the use of the live-spindle by clamping the valve in the recess $i^2$ in the stuffing-box, which clamping is effected by means of the valve-stem $i'$, which is provided with a screw-threaded portion $i^3$, seated in a correspondingly-threaded portion $i^4$ in the stuffing-box, as clearly shown in Fig. 2 of the drawings. By turning the valve-stem $i'$ in a direction to cause it to travel outward the valve $i$ is drawn tightly into the recess $i^2$. When the valve is thus held, the cutter is to be rotated by means of the crank $l'$.

For repairing valve-disks $i$ formed with beveled edges $n$ the jaws $a\,a\,a$ are equipped with cutters $o\,o\,o$, having cutting-faces sloped corresponding to the bevel of the valve. These cutters are mounted on the most protuberant fronts of the jaws, as shown in Fig. 3 of the drawings, and in order to increase the range of adjustment of said cutters in relation to their distances from the axis of the chuck I form each of the cutters $o$ with two cutting edges on opposite ends thereof and sloped in opposite directions. By placing the jaws $a\,a\,a$ in the position shown in Fig. 3 of the drawings the cutters $o\,o\,o$ are adjusted for operating on a small valve-disk, and by reversing the jaws said cutters are carried a sufficient distance apart to operate on a large valve-disk, and such adjustment is effected without disturbing the cutters on their seats on the jaws. For operating on this species of valve-disks the valve-stem attached thereto is to receive rotary motion from the live-spindle of the lathe, as hereinbefore described. The cutters $o$ are prevented from turning on the jaws $a$ by tongue-and-groove joints between said parts, and by means of screws $t$, passing through the cutters and entering screw-threaded sockets in the jaws, said cutters are retained on the jaws.

It is obvious that my invention is adapted for repairing puppet-valves or analogous valves having longitudinal guide-wings, inasmuch as said wings will be accommodated between the jaws $a\,a\,a$ when set in the position shown in Fig. 3 of the drawings.

It will be observed that my invention provides a machine for refacing valves of different forms and sizes by the employment of a universal chuck affording maximum range of adjustment which is conveniently and expeditiously accomplished.

What I claim as my invention is—

1. In a machine for refacing flat-faced valve-disks, the combination of a chuck having synchronously radially adjustable jaws formed with screw-threaded stepped gripping-faces presented toward the axis of the chuck to grip between them the screw-threaded attaching end of the stuffing-box containing the valve-disk and its stem, an annular cutter sustained in the axis of the chuck and means for revolving the valve-stem as set forth.

2. The within-described machine for refacing flat-faced valve-disks of different dimensions, which machine consists of a chuck having synchronously radially adjustable jaws formed with screw-threaded stepped gripping-faces presented toward the axis of the chuck, to grip between them the screw-threaded attaching end of the stuffing-box with the valve-disk fastened therein, each of said jaws formed with flat faces adjacent to the gripping-faces and in planes at right angles to the axis of the chuck to serve as seats for the flange of the stuffing-box, an annular cutter sustained revolubly in the axis of the chuck and means for revolving said cutter as set forth.

3. In a machine for refacing beveled valve-disks, the combination of a chuck having synchronously radially adjustable jaws mounted reversibly on their seats, and cutters mounted detachably on said jaws at one end of each, and each of said cutters having cutting-faces beveled in opposite directions, all constructed and combined to increase the range of adjustment of said cutters in relation to their distances from the axis of the chuck as set forth.

MORTIMER A. ACKLES. [L. S.]

Witnesses:
H. B. SMITH,
J. J. LAASS.